(12) United States Patent
Zheng

(10) Patent No.: US 11,419,275 B2
(45) Date of Patent: Aug. 23, 2022

(54) PRUNING AND SIEVING APPARATUS

(71) Applicant: Phenix Garden Tools Co., Ltd, Hangzhou (CN)

(72) Inventor: Zhicheng Zheng, Hangzhou (CN)

(73) Assignee: Phenix Garden Tools Co., Ltd, Zhejiang (CN)

( * ) Notice: Subject to any disclaimer, the term of this patent is extended or adjusted under 35 U.S.C. 154(b) by 126 days.

(21) Appl. No.: 16/930,032

(22) Filed: Jul. 15, 2020

(65) Prior Publication Data

US 2021/0378180 A1 Dec. 9, 2021

Related U.S. Application Data

(63) Continuation of application No. PCT/CN2020/094802, filed on Jun. 7, 2020.

(51) Int. Cl.
| | | |
|---|---|---|
| *A01G 3/00* | (2006.01) | |
| *A01G 5/00* | (2006.01) | |
| *B02C 18/06* | (2006.01) | |
| *B02C 23/16* | (2006.01) | |
| *B07B 1/00* | (2006.01) | |
| *B07B 9/00* | (2006.01) | |

(52) U.S. Cl.
CPC ............. *A01G 3/002* (2013.01); *A01G 5/00* (2013.01); *B02C 18/067* (2013.01); *B02C 23/16* (2013.01); *B07B 1/00* (2013.01); *B07B 9/00* (2013.01); *B02C 2023/165* (2013.01)

(58) Field of Classification Search
CPC ........ A01G 3/002; A01G 5/00; B02C 18/067; B02C 23/16; B02C 2023/165; B07B 1/00; B07B 1/02; B07B 1/06; B07B 1/46; B07B 1/4609; B07B 9/00
USPC ......................................... 209/304
See application file for complete search history.

(56) References Cited

U.S. PATENT DOCUMENTS

| | | | | |
|---|---|---|---|---|
| 9,616,465 B1 * | 4/2017 | Strawn | ...... | B07B 1/06 |
| 2012/0279907 A1 * | 11/2012 | Peterson | ...... | B03B 5/02 |
| | | | | 209/235 |
| 2015/0027096 A1 * | 1/2015 | Black | ...... | A01D 34/82 |
| | | | | 56/10.1 |
| 2016/0107196 A1 * | 4/2016 | Rosado | ...... | B07B 1/02 |
| | | | | 426/489 |

(Continued)

FOREIGN PATENT DOCUMENTS

CN 104114018 A * 10/2014 ............ A01D 34/82

*Primary Examiner* — Michael McCullough
*Assistant Examiner* — Muhammad Awais
(74) *Attorney, Agent, or Firm* — Fideli Law PLLC

(57) ABSTRACT

Disclosed is a pruning and sieving apparatus, which resolves time-consuming and laborious problems in the existing pruning method of flower plants. The pruning and sieving apparatus includes a hollow body, including two relatively disposed open axial ends; an interior pruning lining attached inside the hollow body, where the interior pruning lining includes a plurality of sidewall pruning holes arranged in a distributed manner; a sieving screen, where the sieving screen includes a plurality of sieving holes arranged in a distributed manner, and is disposed in the interior pruning lining to divide the internal space of the interior pruning lining into a pruning chamber and a collection chamber; and two end caps disposed on the two open axial ends.

16 Claims, 5 Drawing Sheets

(56) References Cited

U.S. PATENT DOCUMENTS

2016/0108555 A1\* 4/2016 Rosado .................... B07B 1/06
209/409

\* cited by examiner

PRUNING AND SIEVING APPARATUS

CROSS-REFERENCE TO RELATED APPLICATIONS

This application is a continuation of International Application No. PCT/CN2020/094802 filed on Jun. 7, 2020, which is incorporated herein by reference in its entirety.

TECHNICAL FIELD

The present invention relates to the field of mechanical design technology, and in particular, to a pruning and sieving apparatus.

BACKGROUND

Nowadays, flower plants with many stems and/or leaves have been widely used, some of them are widely used in the field of traditional Chinese medicine because of their drug characteristics, some of them are displayed at home or in office because of their ornamental characteristics or special fragrance, and some of them are presented as gifts in social activities because of their special commemorative significance. The flowers or fruits of some flower plants are enclosed in multiple stems and/or leaves. After the flower plants are planted and picked, it is usually necessary to remove the excess stems and/or leaves on the surface. The remaining flowers or fruits are preserved to meet the needs of special scenes. However, in the prior art, this removal of excess stems and/or leaves remains dependent on manual scissors. The manual pruning process is time-consuming, which undoubtedly increases cost of such flower plants as a commodity. Therefore, there is an urgent need for a pruning method that can efficiently remove the excess stems and/or leaves of such flower plants and preserve the remaining flowers or fruits.

SUMMARY

Embodiments of the present invention provide a pruning and sieving apparatus, which resolves time-consuming and laborious problems in the existing pruning method of flower plants.

According to an embodiment of the present invention, a pruning and sieving apparatus includes a hollow body, including two relatively disposed open axial ends; an interior pruning lining attached inside the hollow body, where the interior pruning lining includes a plurality of sidewall pruning holes arranged in a distributed manner; a sieving screen, where the sieving screen includes a plurality of sieving holes arranged in a distributed manner, and is disposed in the interior pruning lining to divide the internal space of the interior pruning lining into a pruning chamber and a collection chamber; and two end caps disposed on the two open axial ends.

In an embodiment of this application, the plurality of sidewall pruning holes are arranged in an array.

In an embodiment of this application, the plurality of sieving holes includes a first sieving hole located at the center of the sieving screen, a plurality of annular second sieving holes centered around the center of the sieving screen; and a plurality of third sieving holes radially distributed with the center of the sieving screen as a radiation source, or arranged in an array.

In an embodiment of this application, the pruning and sieving apparatus further includes a funnel disposed on a side of the sieving screen adjacent to the collection chamber, where the funnel includes a oppositely disposed port portion and a nozzle portion, the opening aperture of the nozzle portion is smaller than that of the port portion, and the port portion is closer to the sieving screen than the nozzle portion.

In an embodiment of this application, the hollow body and the interior pruning lining are made of a flexible material. The pruning and sieving apparatus further includes a coil spring provided along the inner surface of the interior pruning lining. The coil spring is configured to maintain the hollow body and the interior pruning lining in an expanded state or compressed into a compressed state under external force.

In an embodiment of this application, the hollow body is made of a flexible material. The pruning and sieving apparatus further includes a first zipper surrounding a sidewall of the hollow body, and the first zipper is configured to divide the hollow body into two parts when it is unzipped.

In an embodiment of this application, the first zipper is configured to divide the hollow body into a smaller upper part and a larger lower part when it is unzipped. When the first zipper is closed, the lower part clads a larger area of a side wall of the pruning chamber than the upper part.

In an embodiment of this application, two ends of the interior pruning lining are stitched with the two open axial ends respectively.

In an embodiment of this application, the periphery of the sieving screen is stitched with the inner surface of the interior pruning lining.

In an embodiment of this application, the hollow body and the interior pruning lining are cylindrical.

In an embodiment of this application, volume of the pruning chamber is larger than that of the collection chamber.

In an embodiment of this application, the end cap is in a droplet shape. The end cap includes a second zipper disposed along the centerline of the droplet shape and diametrically opposed U-shaped strap handles.

In an embodiment of this application, a portion of the end cap located in a middle of the U-shaped strap handle is made of a transparent material.

In an embodiment of this application, the pruning and sieving apparatus further includes two first groove-shaped handles disposed at the open axial end of the hollow body adjacent to the pruning chamber, and/or two opposite second groove-shaped handles disposed respectively at the two open axial ends of the hollow body.

In an embodiment of this application, the second groove-shaped handles are made of a magnetic material, the end caps are in a droplet shape, and magnetic snaps for cooperating with the second groove-shaped handles are disposed at droplet-shape tip portions of the end caps.

In an embodiment of this application, the sieving screen is made of a plastic material, and the interior pruning lining is made of a polyester material.

In an embodiment of this application, the portion of the end cap where the open axial end of the hollow body adjacent to the pruning chamber is located is made of a transparent material.

The embodiments of the present invention provide a pruning and sieving apparatus. An operator may put the flower plant that need to be pruned into the pruning chamber from the end cap near the pruning chamber, and then continuously shake the pruning and sieving apparatus, so that friction occurs between the flower plant and the sidewall of the interior pruning lining and the sieving screen in the pruning chamber, and friction also occurs between different stems of the flower plant. The pruning holes on the sidewall of the interior pruning lining and the sieving holes on the sieving screen are used to cut off excess stems and/or leaves on the surface. These cut-off stems and/or leaves fall into the collection chamber under gravity or external shaking force and the remaining flower product is left in the pruning chamber. In this way, an operator can dump the pruned stems and/or leaves through the end cap near the collection chamber, and obtain the pruned flower product from the end cap near the pruning chamber. It can be seen that by using the pruning and sieving apparatus provided in the embodiments of this application, an operator can quickly pruning flower plants in batches without using any external tools, which can greatly improve pruning efficiency for flower plants and reduce costs of flower plants in commercial circulation.

DETAILED DESCRIPTION OF THE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
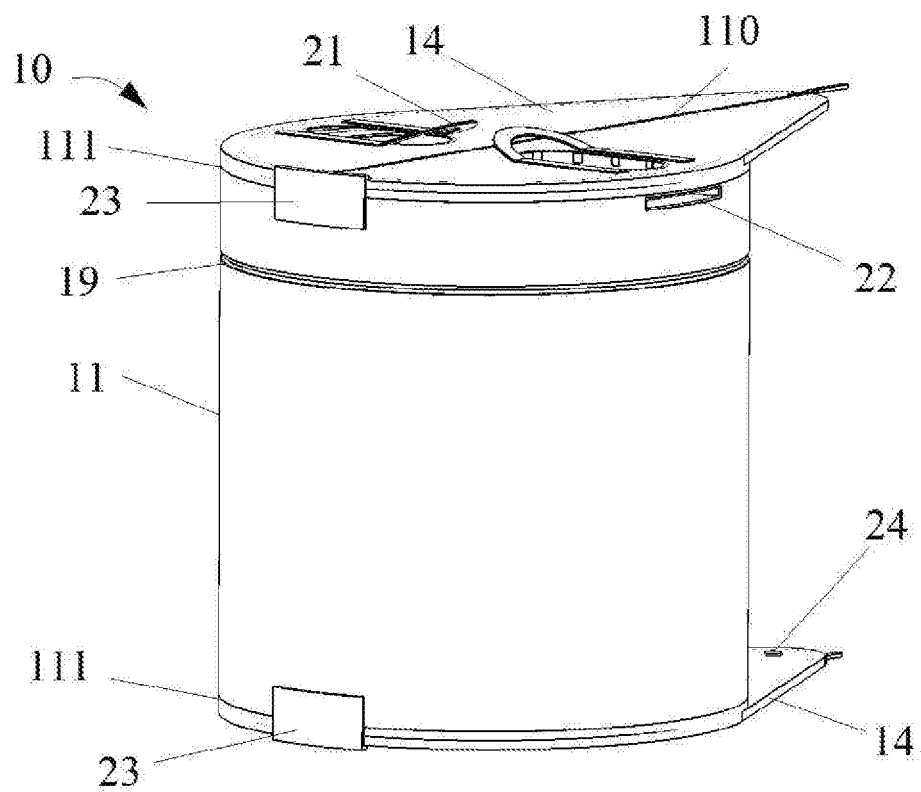
FIG. 1 shows a schematic structural diagram of a pruning and sieving apparatus according to an embodiment of the present invention.
Figure 2:
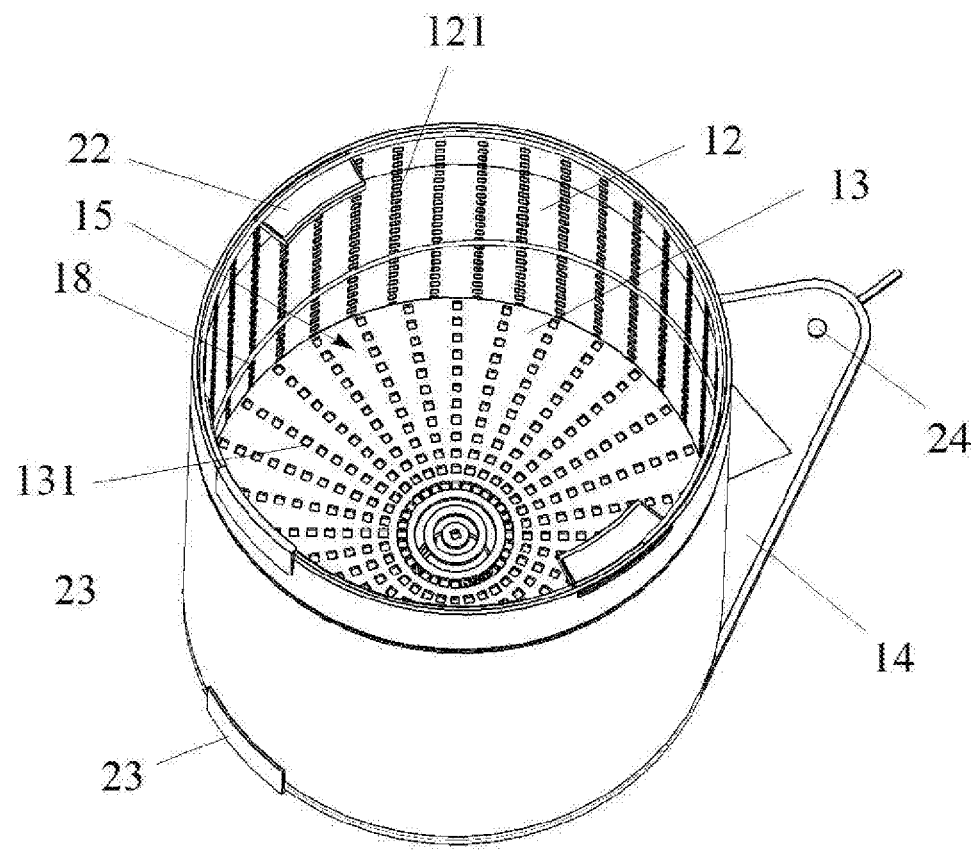
FIG. 2 shows a schematic structural diagram of the pruning and sieving apparatus shown in FIG. 1 for which one end cap is hided.
Figure 3:
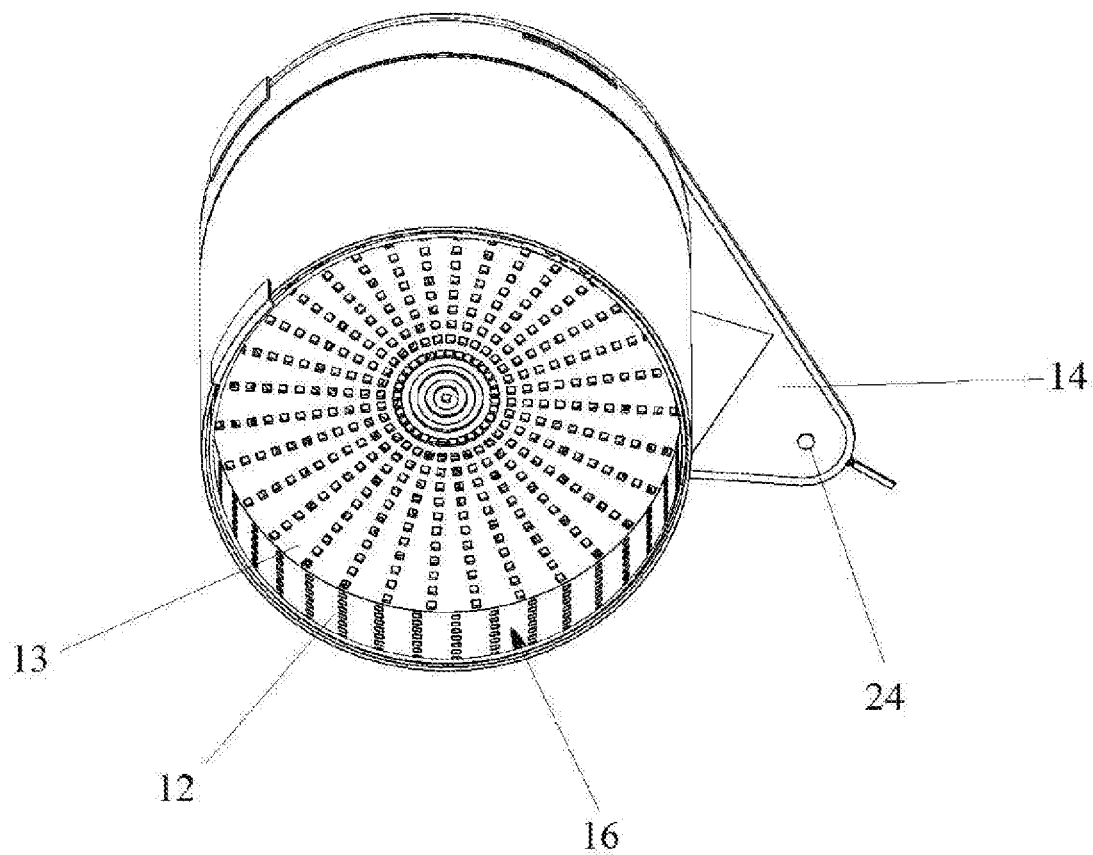
FIG. 3 shows a schematic structural diagram of the pruning and sieving apparatus shown in FIG. 1 for which the other end cap is hided.

FIG. 1 shows a schematic structural diagram of a pruning and sieving apparatus according to an embodiment of this application. FIG. 2 shows a schematic structural diagram of the pruning and sieving apparatus shown in FIG. 1 for which one end cap is hided. FIG. 3 shows a schematic structural diagram of the pruning and sieving apparatus shown in FIG. 1 for which the other end cap is hided.

As shown in FIG. 1, FIG. 2 and FIG. 3, the pruning and sieving apparatus 10 includes a hollow body 11, an interior pruning lining 12, a sieving screen 13 and two end caps 14.

Specifically, the hollow body 11 includes two opposite open axial ends 111, two end caps 14 are respectively disposed on the two open axial ends 111, and the end caps 14 may be opened or closed. The interior pruning lining 12 is attached inside the hollow body 11, and the interior pruning lining 12 includes a plurality of sidewall pruning holes 121 arranged in a distributed manner. The sieving screen 13 includes a plurality of sieving holes 131 arranged in a distributed manner, and is disposed in the interior pruning lining 12 to divide the internal space of the interior pruning lining 12 into a pruning chamber 15 and a collection chamber 16. The pruning chamber 15 is configured to pruning stems and/or leaves of a flower plant by using the sidewall pruning holes 121 and the sieving holes 131, and the collection chamber 16 is configured to collect the pruned stems and/or leaves. In an embodiment of this application, the sieving screen 13 may be made of a plastic material, and the interior pruning lining 12 may be made of a polyester material.

Sidewall pruning holes 121 and sieving holes 131 are used for pruning excess stems and/or leaves and leaving remaining flower product in the pruning chamber 15. Therefore, apertures of the sidewall pruning holes 121 and sieving holes 131 should be large enough to allow pruned stems and/or leaves to be passed through to complete pruning and to be into the collection chamber 16, and the apertures of the sidewall pruning holes 121 and sieving holes 131 need to be small enough to allow the remaining flower product to be kept in the pruning chamber 15. It should be understood that a specific aperture size, arrangement density and arrangement manner of the sidewall pruning holes 121 and sieving holes 131 may be adjusted according to actual application scenarios (for example, actual sizes of various parts of flower plants), which is not limited in this application.

When using the pruning and sieving apparatus 10 provided in the embodiment of the present invention to pruning a flower plant, an operator may put the flower plant that need to be pruned into the pruning chamber 15 from the end cap 14 near the pruning chamber 15. After closing the end cap 14, the operator continuously shakes the pruning and sieving apparatus 10. During shaking, friction occurs between the flower plant and the sidewall of the interior pruning lining 12 and the sieving screen 13 in the pruning chamber 15, and friction also occurs between different stems of the flower plant. The pruning holes 121 on the sidewall of the interior pruning lining 12 and the sieving holes 131 on the sieving screen 13 are used to cut off excess stems and/or leaves on the surface. These cut-off stems and/or leaves fall into the collection chamber 16 under gravity or the operator's shaking force, and the remaining flower product is left in the pruning chamber 15. In this way, the operator can dump the pruned stems and/or leaves through the end cap 14 near the collection chamber 16, and obtain the pruned flower product from the end cap 14 near the pruned chamber 15. It can be seen that by using the pruning and sieving apparatus 10 provided in the embodiment of this application, an operator can quickly pruning flower plants in batches without using any external tools, which can greatly improve pruning efficiency for flower plants and reduce costs of flower plants in commercial circulation.

In an embodiment of this application, as shown in FIG. 2, to ensure that a flower plant in the pruning chamber 15 can be pruned from all angles, a plurality of sidewall pruning holes 121 may be arranged in an array on the sidewall of the interior pruning lining 12.

Figure 2A:
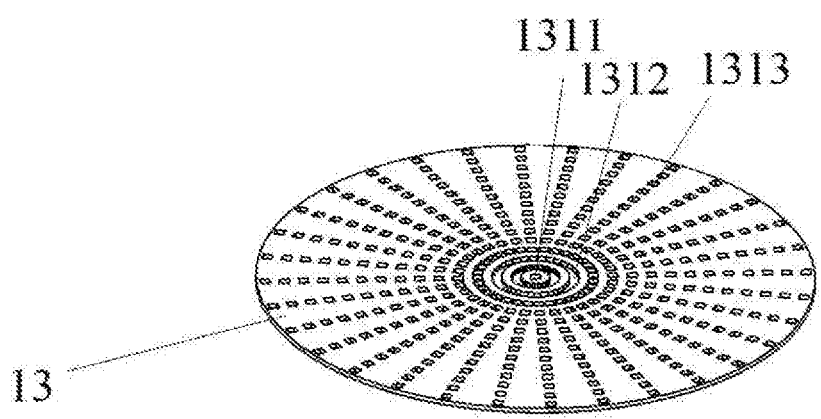
FIG. 2a shows a schematic structural diagram of a sieving screen in a pruning and sieving apparatus according to an embodiment of this application.

In an embodiment of this application, as shown in FIG. 2a, the plurality of sieving holes 131 on the sieving screen 13 may include a first sieving hole 1311 located at the center of the sieving screen 13, a plurality of annular second sieving holes 1312 centered around the center of the sieving screen 13, and a plurality of third sieving holes 1313 radially distributed with the center of the sieving screen 13 as a radiation source. Since the annular second sieving holes 1312 form continuous rings and have a large area, more pruned stems and/or leaves can fall into the collection chamber 16 through the annular second sieving holes 1312 located in the center. Since the third sieving holes 1313 are radially distributed, the further away from the center of the sieving screen 13, the sparser the distribution of the third sieving holes 1313. Therefore, less pruned stems and/or leaves fall into the collection chamber 16 through peripheral third sieving holes 1313. In this way, after an operator finishes a pruning process by shaking the pruning and sieving apparatus 10, the operator can shake the pruning and sieving apparatus 10 up and down in the direction of gravity, so that the stems and/or leaves from the pruning chamber 15 fall into the collection chamber 16 through the sieving screen 13. Since the sieving holes 131 on the sieving screen 13 are distributed in the manner described above, the stems and/or leaves collected in the collection chamber 16 may be stacked thick in the middle and thin in periphery, rather than scattered randomly in various corners of the collection chamber 16, thereby facilitating collection and dumping.

Figure 2B:
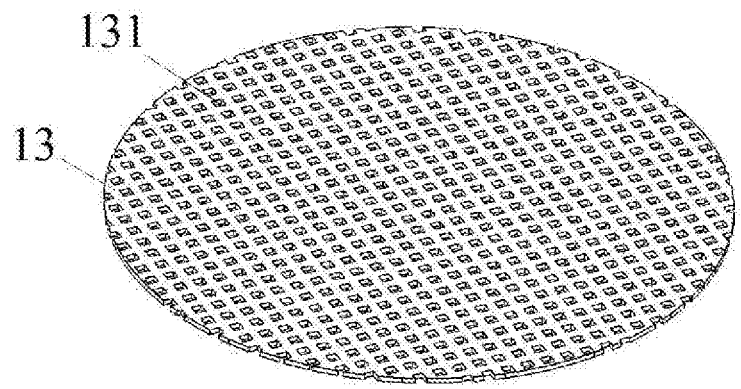
FIG. 2b shows a schematic structural diagram of a sieving screen in a pruning and sieving apparatus according to another embodiment of this application.

It should be understood that although the embodiment shown in FIG. 2a gives a distribution of the sieving holes 131 on the sieving screen 13, in another embodiment of this application, the sieving holes 131 on the sieving screen 13 may also be arranged in an array so that stems and/or leaves collected by the collection chamber 16 may be evenly distributed, as shown in FIG. 2b.

Figure 4:
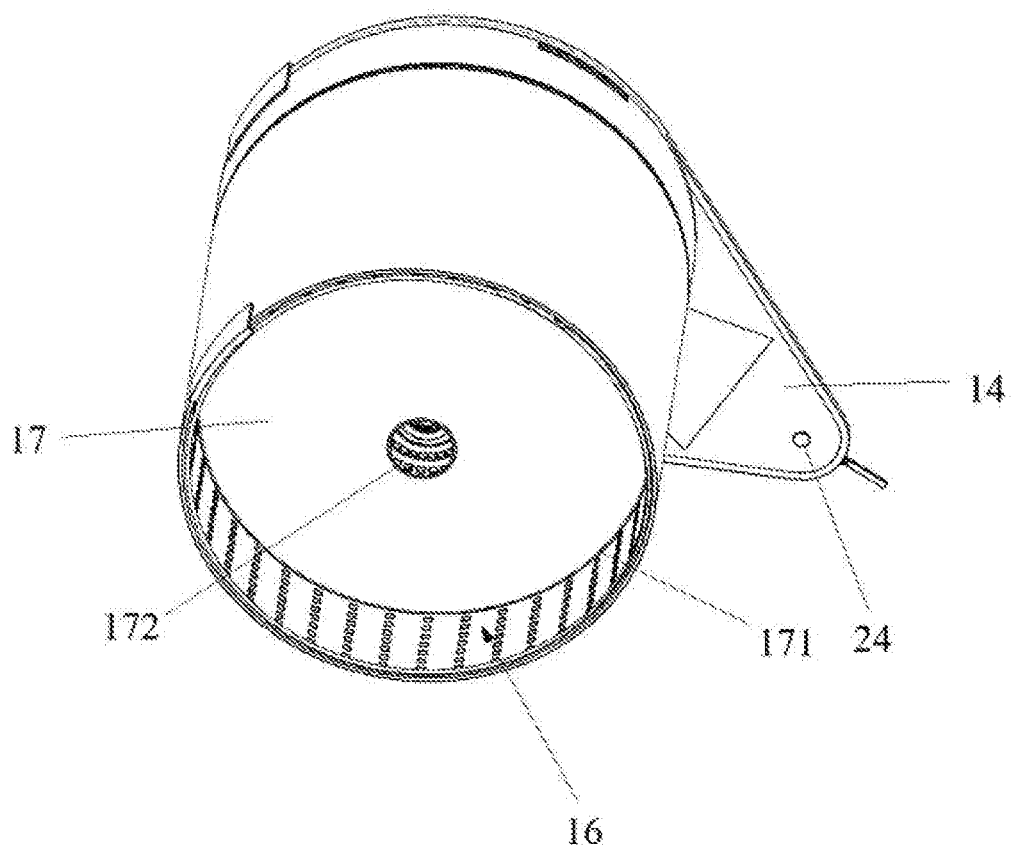
FIG. 4 is a schematic structural diagram of a pruning and sieving apparatus according to another embodiment of the present invention for which the other end cap is hided.

In an embodiment of this application, as shown in FIG. 4, the pruning and sieving apparatus 10 may further include a funnel 17 disposed on a side of the sieving screen 13 adjacent to the collection chamber 16, where the funnel 17 includes an oppositely disposed port portion 171 and a nozzle portion 172. The opening aperture of the nozzle portion 172 is smaller than that of the port portion 171, and the port portion 171 is closer to the sieving screen 13 than the nozzle portion 172. By providing the funnel 17 in the collection chamber 16, after falling into the collection chamber 16 through the sieving screen 13, the pruned stems and/or leaves fall into the port portion 171 of the funnel 17, slide into the nozzle portion 172 along the sidewall of the funnel 17, and fall into the bottom portion of the collection chamber 16 through the nozzle portion 172, so that the stems and/or leaves finally collected in the collection chamber 16 can be stacked thick in the middle and thin in periphery, rather than scattered randomly at every corner of the collection chamber 16, which is more convenient to collect and fall. In the meantime, since the opening aperture of the nozzle portion 172 is smaller than that of the port portion 171, even if an operator reverses the pruning and sieving apparatus 10 due to misoperation, the stems and/or leaves in the collection chamber 16 cannot return to the pruning chamber 15 through the nozzle portion 172, and can only accumulate at the opening of the nozzle portion 172. It can be seen that the funnel 17 also has an effect of preventing stems and/or leaves from returning to the pruning chamber 15 due to operator's misoperation of reversing.

Figure 5:
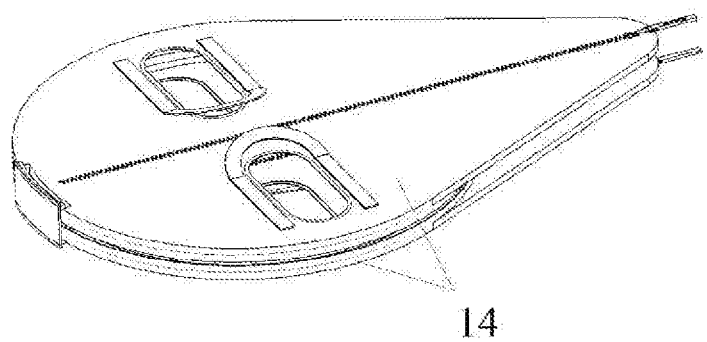
FIG. 5 shows a schematic structural diagram of a pruning and sieving apparatus in a compressed state according to an embodiment of the present invention.

In an embodiment of this application, both a hollow body 11 and an interior pruning lining 12 are made of a flexible material. As shown in FIG. 1, the pruning and sieving apparatus 10 may further include a coil spring 18 provided along the inner surface of the interior pruning lining 12. The coil spring 18 is configured to maintain the hollow body 11 and the interior pruning lining 12 in an expanded state or compressed into a compressed state under external force. Specifically, in the absence of external compression force, the natural state of the coil spring 18 can maintain the hollow body 11 and the interior pruning lining 12 in the expanded state. An operator needs to maintain the hollow body 11 and the interior pruning lining 12 in the expanded state when using the pruning and sieving apparatus 10. When the operator does not need to use the pruning and sieving apparatus 10, for convenience of storage, the operator may compress the coil spring 18 by applying a compression force to one end cap 14 of the pruning and sieving apparatus 10. Since both the hollow body 11 and the interior pruning lining 12 are made of a flexible material (such as polyester material), the hollow body 11 and the interior pruning lining 12 are compressed into a flat flake, as shown in FIG. 5, thereby greatly reducing a volume of the pruning and sieving apparatus 10, which is convenient for storage. In an embodiment of this application, an inner surface of the interior pruning lining 12 may be provided with a spiral ring-shaped wrapping edge. The coil spring 18 may be penetrated into the wrapping edge to be fixed with the interior pruning lining 12. However, it should be understood that the coil spring 18 may also be fixed with the interior pruning lining 12 in another manner, which is not limited in this application.

In an embodiment of this application, both the hollow body 11 and the interior pruning lining 12 are cylindrical. The interior pruning lining 12 needs to be nested inside the hollow body 11, and thus the diameter of the cylindrical shape of the interior pruning lining 12 is smaller than that of the hollow body 11. When an operator compresses the coil spring 18 to compress the pruning and sieving apparatus 10, the pruning and sieving apparatus 10 is compressed into a circular cake shape, as shown in FIG. 5, which is very convenient for transportation and storage.

Figure 6:
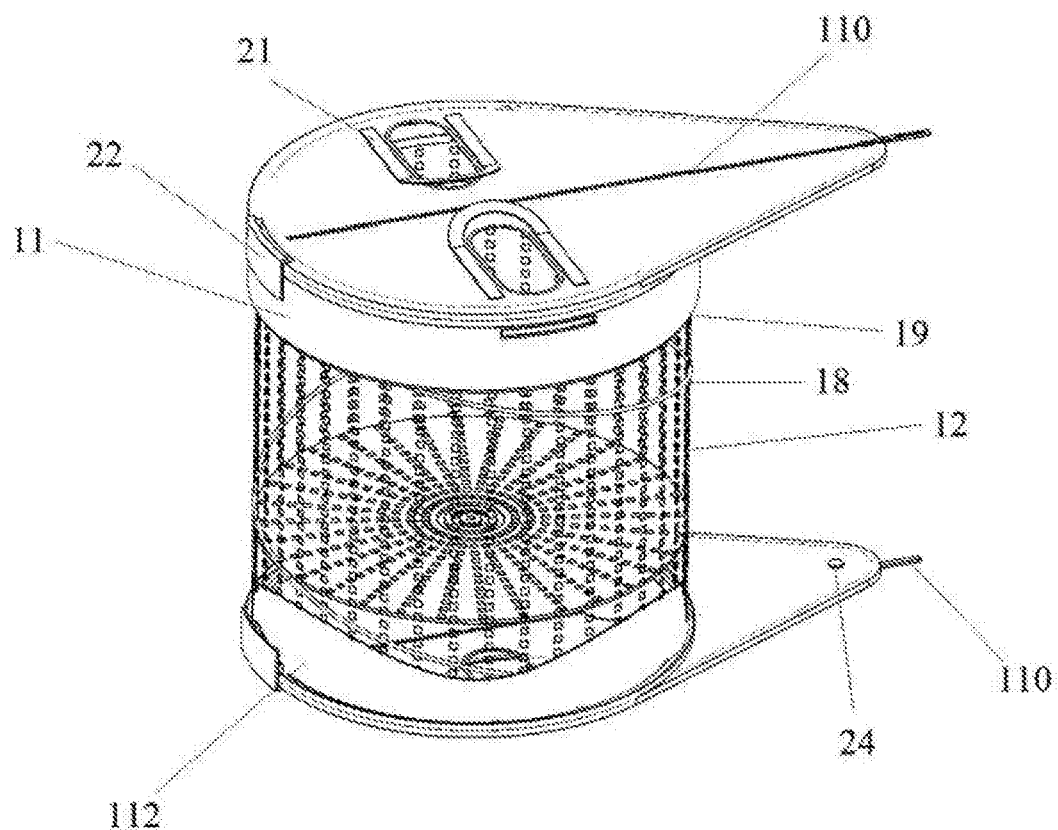
FIG. 6 is a schematic structural diagram of a pruning and sieving apparatus according to an embodiment of the present invention for which a first zipper is in an unzipped state.

In an embodiment of this application, the hollow body 11 is made of a flexible material. As shown in FIG. 1, the pruning and sieving apparatus 10 may further include a first zipper 19 surrounding a sidewall of the hollow body 11, and the first zipper 19 is configured to divide the hollow body 11 into two parts when it is unzipped. Specifically, when the first zipper 19 is unzipped, the hollow body 11 is divided into upper and lower parts. Because the hollow body 11 uses a flexible material, the lower part of the hollow body 11 can be stacked at the bottom of the collection chamber 16 under gravity, as shown in FIG. 6, so that the pruning chamber 15 and the collection chamber 16 are exposed to air to dry flower plants.

In a further embodiment, as shown in FIG. 1, the first zipper 19 is configured to divide the hollow body 11 into a smaller upper part and a larger lower part when it is unzipped. When the first zipper 19 is closed, the lower part clads a larger area of a side wall of the pruning chamber 15 than the upper part. Thus, when the first zipper 19 is unzipped and the lower part is stacked at the bottom of the collection chamber 16, most part of the pruning chamber 15 is exposed to air, thereby better drying flower plants to be pruned or pruned flower product in the pruning chamber 15. In the meantime, since the surface of the interior pruning lining 12 includes a plurality of sidewall pruning holes 121, these sidewall pruning holes 121 can also effectively serve as ventilation.

It should be understood that a drying step may be before or after a pruning step, and may be specifically adjusted according to a requirement of an actual application scenario. For some flower plants, before pruning, the flower plants to be pruned may be placed in the pruning chamber 15, and the first zipper 19 may be unzipped to retract the lower part of the hollow body 112 to dry the flower plants in the pruning chamber 15, so that moisture in stems and/or leaves is effectively lost. Then pruning is performed by shaking the pruning and sieving apparatus 10. In this way, excess stems and/or leaves can be pruned more quickly and effectively. For some other flower plants, remaining flower products after pruning can be used only after effective drying. In this case, after the pruning process is finished, the first zipper 19 is unzipped to retract the lower part of the hollow body 112 to dry the flower products in the pruning chamber 15. The application does not impose strict restrictions on the sequence of the specific steps of drying and pruning by using the pruning and sieving apparatus 10.

In an embodiment of this application, two ends of the interior pruning lining 12 are respectively fixed with the two end caps 14 by stitching. In another embodiment of this application, the periphery of the sieving screen 13 and the inner surface of the interior pruning lining 12 are fixed by stitching. However, it should be understood that the interior pruning lining 12, the end caps 14 and the sieving screen 13 may be respectively fixed in another manner, for example, a zipper is provided along the junction part, bonded or woven by a weave belt, which is not strictly limited in this application.

In an embodiment of this application, considering that volume of stems and/or leaves pruned from some flower plants is smaller than that of remaining flower products, volume of the pruning chamber 15 may be designed to be larger than that of the collection chamber 16. However, it should be understood that adjusting of the volume of the pruning chamber 15 and the volume of the collection chamber 16 may be implemented by adjusting a position of the sieving screen 13 in the interior pruning lining 12. For some other species of flower plants, volume of pruned stems and/or leaves may be larger than that of the remaining flower products. In this case, the volume of the pruning chamber 15 may alternatively be designed as smaller than that of the collection chamber 16, which is not limited in this application.

In an embodiment of this application, as shown in FIG. 1, the end cap 14 may be in a droplet shape. The end cap 14 includes a second zipper 110 disposed along the centerline of the droplet shape and diametrically opposed U-shaped strap handles 21. In this way, an operator may obtain a flower product in the pruning chamber 15 or stems and/or leaves in the collection chamber 16 by unzipping the second zipper 110. During pruning, the second zipper 110 needs to be closed. During shaking of the pruning and sieving apparatus 10, the operator can grasp the diametrically opposed U-shaped strap handles 21 by hand to complete shaking actions. In addition, it is convenient for the operator to lift the pruning and sieving apparatus 10 by hand during transportation or storage. Because the end cap 14 is in a droplet shape, when the second zipper 110 is unzipped to dump the flower products in the pruning chamber 15 or the stems and/or leaves in the collection chamber 16, the droplet shape of the end cap 14 may play a role of guiding and preventing side leakage, thereby better completing the dumping action.

In a further embodiment, as shown in FIG. 1, a portion of the end cap 14 located in the middle of the U-shaped strap handle 21 is made of a transparent material. Considering that an operator may have a misoperation to reverse the pruning and sieving apparatus 10, this causes pruned stems and/or leaves in the collection chamber 16 to return to the primed chamber 15. By setting transparent material portion on the end cap 14, it is easy for a user to observe the pruning chamber 15 and confirm that the pruning chamber 15 is facing upwards so as to avoid misoperation. It is also possible for the user to observe pruning status in the pruning chamber 15 through the transparent material portion without opening the end cap 14.

In a further embodiment, alternatively, the portion of the end cap 14 where an open axial end 111 of the hollow body 11 adjacent to the pruning chamber 15 is located may be made of a transparent material, so that a user can more intuitively observe the pruning chamber 15 and confirm that the pruning chamber 15 is currently facing upwards to avoid misoperation of reversing.

In an embodiment of this application, as shown in FIG. 1, the priming and sieving apparatus 10 may further include two first groove-shaped handles 22 disposed at the open axial end 111 of the hollow body 11 adjacent to the pruning chamber 15; and/or two opposite second groove-shaped handles 23 disposed respectively at the two open axial ends 111 of the hollow body 11. The two first groove-shaped handles 22 may facilitate an operator to shake the pruning and sieving apparatus 10, and the two second groove-shaped handles 23 may facilitate the operator to shake the pruning and sieving apparatus 10 from other angles.

In a further embodiment, the second groove-shaped handles 23 are made of a magnetic material, the end caps 14 are in a droplet shape, and magnetic snaps 24 for cooperating with the second groove-shaped handles 23 are disposed at droplet-shape tip portions of the end caps 14. In this way, the droplet-shape tip portions of the end caps 14 may be fitted to the second groove-shaped handles 23 so as to avoid reduction of user experience because the droplet-shape tip portions of the end caps 14 swing back and forth of during shaking.

The foregoing description is merely a preferred embodiment of the present invention, and is not intended to limit the present invention. Any modification or equivalent replacement made within the spirit and principles of the present invention shall be included in the protection scope of the present invention.

What is claimed is:

1. A pruning and sieving apparatus, comprising:
   a hollow body, comprising two open axial ends relatively disposed;
   an interior pruning lining, attached inside the hollow body, wherein the interior pruning lining comprises a plurality of sidewall pruning holes arranged in a distributed manner;
   a sieving screen, wherein the sieving screen comprises a plurality of sieving holes arranged in a distributed manner, and is disposed in the interior pruning lining to divide an internal space of the interior pruning lining into a pruning chamber and a collection chamber;
   two end caps disposed on the two open axial ends; and
   a first zipper surrounding a sidewall of the hollow body, and the first zipper is configured to divide the hollow body into two parts when the first zipper is unzipped, wherein the hollow body is made of a flexible material.

2. The pruning and sieving apparatus of claim 1, wherein the plurality of sidewall pruning holes is arranged in an array.

3. The pruning and sieving apparatus of claim 1, wherein the plurality of sieving holes comprises a first sieving hole located at a center of the sieving screen, a plurality of annular second sieving holes centered around the center of the sieving screen, and a plurality of third sieving holes radially distributed with the center of the sieving screen as a radiation source; or the plurality of sieving holes is arranged in an array.

4. The pruning and sieving apparatus of claim 1, further comprising a funnel disposed on a side of the sieving screen adjacent to the collection chamber;

wherein the funnel comprises an oppositely disposed port portion and a nozzle portion and a nozzle portion, an opening aperture of the nozzle portion is smaller than an opening aperture of the port portion, and the port portion is closer to the sieving screen than the nozzle portion.

5. The pruning and sieving apparatus of claim 1, wherein the interior pruning lining is made of a flexible material;

and the pruning and sieving apparatus further comprises a coil spring provided along an inner surface of the interior pruning lining; and the coil spring is configured to maintain the hollow body and the interior pruning lining in an expanded state or compressed into a compressed state under external force.

6. The pruning and sieving apparatus of claim 1, wherein the first zipper is configured to divide the hollow body into a smaller upper part and a larger lower part when the first zipper is unzipped; when the first zipper is closed, the lower part clads a larger area of a side wall of the pruning chamber than the upper part.

7. The pruning and sieving apparatus of claim 1, wherein two ends of the interior pruning lining are stitched with the two open axial ends respectively.

8. The pruning and sieving apparatus of claim 1, wherein a periphery of the sieving screen is stitched with an inner surface of the interior pruning lining.

9. The pruning and sieving apparatus of claim 1, wherein the hollow body and the interior pruning lining are cylindrical.

10. The pruning and sieving apparatus of claim 1, wherein volume of the pruning chamber is larger than volume of the collection chamber.

11. The pruning and sieving apparatus of claim 1, wherein the end cap is in a droplet shape;

and the end cap comprises a second zipper disposed along a centerline of the droplet shape and diametrically opposed U-shaped strap handles.

12. The pruning and sieving apparatus of claim 11, wherein a portion of the end cap located in a middle of the U-shaped strap handles is made of a transparent material.

13. The pruning and sieving apparatus of claim 1, further comprising:

two first groove-shaped handles disposed at the open axial end of the hollow body adjacent to the pruning chamber, and/or two opposite second groove-shaped handles disposed respectively at the two open axial ends of the hollow body.

14. The pruning and sieving apparatus of claim 13, wherein the second groove-shaped handles are made of a magnetic material, the end caps are in a droplet shape, and magnetic snaps for cooperating with the second groove-shaped handles are disposed at droplet-shape tip portions of the end caps.

15. The pruning and sieving apparatus of claim 1, wherein the sieving screen is made of a plastic material, and the interior pruning lining is made of a polyester material.

16. The pruning and sieving apparatus of claim 1, wherein a portion of the end cap where the open axial end of the hollow body adjacent to the pruning chamber is located is made of a transparent material.

\* \* \* \* \*